US012783388B2

(12) United States Patent
Peranandam et al.

(10) Patent No.: US 12,783,388 B2
(45) Date of Patent: Nov. 3, 2026

(54) GENERATION OF DIVERSIFIED VALIDATION TEST SUITE FOR GENERATIVE ARTIFICIAL INTELLIGENCE POWERED TOOLS

(71) Applicant: GM Global Technology Operations LLC, Detroit, MI (US)

(72) Inventors: Prakash M. Peranandam, Rochester Hills, MI (US); Ramesh Sethu, Troy, MI (US); Arun Adiththan, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 18/816,305

(22) Filed: Aug. 27, 2024

(65) Prior Publication Data

US 2026/0064566 A1 Mar. 5, 2026

(51) Int. Cl.
*G06F 11/3668* (2025.01)

(52) U.S. Cl.
CPC ...... *G06F 11/3676* (2013.01); *G06F 11/3684* (2013.01)

(58) Field of Classification Search
CPC .......................... G06F 11/3676; G06F 11/3684
See application file for complete search history.

(56) References Cited

U.S. PATENT DOCUMENTS 12,572,451 B1 * 3/2026 Leonard .............. G06F 11/3688
2014/0282422 A1 * 9/2014 Tuffs ................... G06F 11/3428 717/127
2016/0350283 A1 12/2016 Carus et al.
2020/0401503 A1 * 12/2020 Gao .................... G06F 11/3672
(Continued)

FOREIGN PATENT DOCUMENTS

CN 105260232 A * 1/2016
CN 112817839 A * 5/2021 .......... G06F 11/3684
(Continued)

OTHER PUBLICATIONS

Agarwal, et al. "Promptwizard: Task-aware agent-driven prompt optimization framework" arXiv e-prints, May 28, 2024. URL: https://arxiv.org/pdf/2405.18369v1.
(Continued)

*Primary Examiner* — S. Sough
*Assistant Examiner* — Chong V Luu
(74) *Attorney, Agent, or Firm* — Vivacqua Crane, PLLC

(57) ABSTRACT

A diversified validation test suite application (DVTSA) for a generative AI powered tool or large language model (LLM) tool includes at least first, second, and third control logics. The first control logic receives a seed test input or user input, analyzes the seed test input or user input, and extracts key elements for variations. The second control logic performs a coverage measurement of outputs of the first control logic. The third control logic causes a human validator to evaluate outputs of the second control logic relative to predefined coverage metrics and selectively and continuously iterate to cause outputs of the second control logic to increase LLM tool input robustness and output robustness from a first level to a second level greater than the first level, in both production and pre-production LLM tool processes.

20 Claims, 5 Drawing Sheets

(56) References Cited

U.S. PATENT DOCUMENTS

| | | | |
|---|---|---|---|
| 2024/0095460 | A1 | 3/2024 | Xu et al. |
| 2024/0185000 | A1 | 6/2024 | Das et al. |
| 2025/0200968 | A1 | 6/2025 | Nguyen |
| 2025/0202844 | A1 | 6/2025 | Lin et al. |
| 2025/0363732 | A1 | 11/2025 | Boyd |
| 2026/0023795 | A1 | 1/2026 | Najmabadi et al. |
| 2026/0029780 | A1 | 1/2026 | Marie et al. |
| 2026/0064566 | A1 | 3/2026 | Peranandam et al. |

FOREIGN PATENT DOCUMENTS

| | | | | | |
|---|---|---|---|---|---|
| CN | 114840422 | A | * | 8/2022 | .......... G06F 11/3684 |
| DE | 102024117097 | A1 | | 8/2024 | |

OTHER PUBLICATIONS

Bai, Yu et al. "Pistis-RAG: Enhancing Retrieval-Augmented Generation with Human Feedback." arXiv e-prints, Aug. 1, 2024. URL:https://arxiv.org/pdf/2407.00072v4.

Brychcin, Tomas and Lukás Svoboda. "UWB at SemEval-2016 Task 1: Semantic Textual Similarity using Lexical, Syntactic, and Semantic Information." In Proceedings of the 10th International Workshop on Semantic Evaluation (SemEval—2016), pp. 588-594, San Diego, California. Association for Computational Linguistics.

Ferreira et al.,"Assessing sentence similarity through lexical, syntactic and semantic analysis", Computer Speech & Language, vol. 39, 2016, pp. 1-28, ISSN 0885-2308, https://doi.org/10.1016/j.csl.2016.01.003.

* cited by examiner

GENERATION OF DIVERSIFIED VALIDATION TEST SUITE FOR GENERATIVE ARTIFICIAL INTELLIGENCE POWERED TOOLS

INTRODUCTION

The present disclosure relates to systems and methods for generating validation test suites for artificial intelligence powered tools, and more specifically to automatic generation of validation and evaluation test suites for large language model powered tools. Artificial intelligence (AI) models, including large language models (LLMs) are increasingly being used to perform tasks for end users in a variety of technical and non technical pursuits. Outputs of AI models, including LLMs, can be hampered by lack of systematic coverage metrics, non-diversified test sets and uneven test coverages and coverage measurements. Additionally, validation of outputs from AI models, including LLMs, utilizes human-driven validation test case development that are both time and labor intensive as well as good chance of being incomplete.

Accordingly, while current systems and methods for validation of generative AI powered tools achieve their intended purpose, there is a need for a new and improved system and method for generation of a diversified validation test suite for generative AI powered tools that reduces the human time and labor input by automating generation of the validation test suite, improving or optimizing systematic coverage metrics, diversifying a set of tests with coverage metrics, while reducing resource utilization from a first level to a second level lest than the first, and streamlining and increasing validation process speeds without increasing system assembly complexity or hardware complexity, and while reducing the human involvement from a first level to second level lest than the first, and streamlining with improved coverage to gain increased confidence in the generative AI powered tool before deployment.

SUMMARY

According to several aspects of the present disclosure, a system for generating a diversified validation test suite for generative artificial intelligence (AI) powered tools includes: a controller having a processor, a memory, and input/output (I/O) ports. The processor executes programmatic control logic stored in the memory. The programmatic control logic includes a diversified validation test suite application (DVTSA) for a generative AI powered tool or large language model (LLM) tool. The DVTSA includes at least first, second, and third control logics. The first control logic receives a seed test input or user input via the I/O ports, and analyzes the seed test input or user input and extracts key elements for variations. The second control logic performs a coverage measurement of outputs of the first control logic. The third control logic causes a human validator to evaluate outputs of the second control logic relative to predefined coverage metrics and selectively and continuously iterate to cause outputs of the second control logic to increase LLM tool input robustness and output robustness from a first level to a second level greater than the first level, in both production and pre-production LLM tool processes. The system progressively reduces computational resource utilization, progressively increases computational efficiency, and progressively reduces reliance on the human validator.

In another aspect of the present disclosure, the first control logic further includes a control logic for extracting syntactical information from the seed test input or user input, and a control logic that identifies and fills information gaps in extracted syntactical information. The first control logic also synthesizes variations that actively adapt to fill identified information gaps.

In another aspect of the present disclosure the control logic for extracting syntactical information further includes control logic that collects all seed test input or user input coverage terms including extracting individual key terms, and control logic that quantifies output of coverage points based on corresponding test outputs and language information relating to extracted individual key terms. The control logic for extracting syntactical information also automatically generates a script utilizing the individual key terms extracted and utilizes supplementary documents and the quantified output of the coverage points to collect all coverage points.

In another aspect of the present disclosure the supplementary documents further include: predefined language information including linguistic databases, mathematical databases, syntactic and semantic databases, such as: GridXML, ROBOT Script, natural language databases, mathematical terminology and databases of variables, statements, and terms defined with respect to system hardware.

In another aspect of the present disclosure the input coverage terms include: predefined term and statements for known inputs and outputs of the system. The coverage metrics are variable and actively and automatically updated. The coverage metrics include an input robustness score and an output robustness score. Each of the input and output robustness scores define a percentage of coverage of a list of or of all possible output instructions of a particular type and name to variable mapping.

In another aspect of the present disclosure the input robustness score further accounts for: variations in input terminology, variations in input statement types and variations in substring interpretation coverage. The output robustness score includes a percentage of coverage of a list of or of all possible output instructions and names to variable mapping.

In another aspect of the present disclosure the control logic that identifies and fills information gaps further includes: control logic that reads, from outputs of the control logic for extracting syntactical information, all terms and phrases relevant to the coverage metrics and splits the terms and phrases into key elements. The control logic that identifies and fills information gaps also includes first and second looped control logics. The first looped control logic identifies variations for each of the key terms in a given context, and assigns a confidence score to each of the variations for each of the key terms. The second looped control logic identifies input variations for each seed test input statement and user input statement, and assigns a confidence score to each of the seed test input and user input statements.

In another aspect of the present disclosure the first control logic further includes control logic that causes the human validators to manually evaluate outputs of each of the first and second looped control logics for identifying variations for each of the key terms and for each of the seed test input and user input statements.

In another aspect of the present disclosure the second control logic further includes control logic that applies the coverage metrics to outputs of the first control logic, including: measuring a seed expansion for variation in input terms; measuring a seed expansion for a variation in input statement types; measuring a seed expansion for substring interpretation coverage; measuring a seed expansion for output robustness; and aggregating and normalizing measured seed expansions for the variation in input terms, the variation in input statement types, the substring interpretation, and output robustness, and generating a coverage measurement score.

In another aspect of the present disclosure the third control logic further includes: control logic that causes the human validator to evaluate outputs of the second control logic by selectively and continuously adding to or eliminating examples from the supplementary documents; and control logic that causes the human validator to convert the coverage measurement into an improved seed file and selectively and continuously iterating inputs to the control logic that synthesizes variations that actively adapt to fill identified information gaps to increase LLM tool input and output robustness from the first level to the second level greater than the first level in both production and pre-production LLM tool processes.

In further aspects of the present disclosure a method for generating a diversified validation test suite for generative artificial intelligence (AI) powered tools includes: executing programmatic control logic stored in memory of a controller having a processor, a memory, and input/output (I/O) ports. The programmatic control logic includes a diversified validation test suite application (DVTSA) for a generative AI powered tool or large language model (LLM) tool. The method further includes: receiving a seed test input or user input via the I/O ports; analyzing the seed test input or user input; extracting key elements within the seed test input or user input for variations; performing a coverage measurement of outputs of the analyzing and extracting steps; and evaluating outputs relative to predefined coverage metrics and selectively and continuously iterating to increase LLM tool input robustness and output robustness from a first level to a second level greater than the first level, in both production and pre-production LLM tool processes. The method progressively reduces computational resource utilization, progressively increases computational efficiency, and progressively reduces reliance on a human validator.

In another aspect of the present disclosure the method further includes extracting syntactical information from the seed test input or user input; identifying and filling information gaps in extracted syntactical information; and synthesizing variations that actively adapt to fill identified information gaps.

In another aspect of the present disclosure the method further includes collecting all seed test input or user input coverage terms including extracting individual key terms; quantifying output of coverage points based on corresponding test outputs and language information relating to extracted individual key terms; and automatically generating a script utilizing the individual key terms extracted. The method further includes utilizing supplementary documents and the quantified output of the coverage points to collect all coverage points.

In another aspect of the present disclosure, utilizing supplementary documents further includes: accessing and referencing predefined language information including linguistic databases, mathematical databases, syntactic and semantic databases, such as: GridXML, ROBOT Script, natural language databases, mathematical terminology and databases of variables, statements, and terms defined with respect to system hardware.

In another aspect of the present disclosure collecting all seed test input or user input coverage terms further includes collecting predefined term and statements for known inputs and outputs of the method. The coverage metrics are variable and actively and automatically updated, and the coverage metrics include an input robustness score and an output robustness score. Each of the input and output robustness scores define a percentage of coverage of a list of or of all possible output instructions of a particular type and name to variable mapping.

In another aspect of the present disclosure evaluating outputs relative to predefined coverage metrics further includes evaluating outputs relative to the input robustness score. The input robustness score accounts for: variations in input terminology; variations in input statement types; and variations in substring interpretation coverage; and evaluating outputs relative to the output robustness score. The output robustness score is a percentage of coverage of a list of or of all possible output instructions and names to variable mapping.

In another aspect of the present disclosure the method further includes reading, from outputs of the extracting syntactical information, all terms and phrases relevant to the coverage metrics and splits the terms and phrases into key elements, identifying, with a first looped control logic, variations for each of the key terms in a given context, and assigning a confidence score to each of the variations for each of the key terms; and identifying, with a second looped control logic, input variations for each seed test input statement and user input statement, and assigning a confidence score to each of the seed test and user input statements. The method further includes causing human validators to manually evaluate outputs of each of the looped control logics for identifying variations for each of the key terms and for each of the seed test input and user input statements.

In another aspect of the present disclosure the method further includes applying the coverage metrics to outputs including: measuring a seed expansion for variation in input terms; measuring a seed expansion for a variation in input statement types; measuring a seed expansion for substring interpretation coverage; measuring a seed expansion for output robustness, and aggregating and normalizing measured seed expansions for the variation in input terms, the variation in input statement types, the substring interpretation, and output robustness, and generating a coverage measurement score.

In another aspect of the present disclosure the method further includes causing the human validator to evaluate outputs by selectively and continuously adding to or eliminating examples from the supplementary documents; and causing the human validator to convert the coverage measurement into an improved seed file and selectively and continuously iterating inputs to the control logic that synthesizes variations that actively adapt to fill identified information gaps to increase LLM tool input and output robustness from the first level to the second level greater than the first level in both production and pre-production LLM tool processes.

In further aspects of the present disclosure, a method for generating a diversified validation test suite for generative artificial intelligence (AI) powered tools includes executing programmatic control logic stored in memory of a controller having a processor, the memory, and input/output (I/O) ports, the processor executing the programmatic control logic. The programmatic control logic includes a diversified validation test suite application (DVTSA) for a generative AI powered tool or large language model (LLM) tool. The DVTSA includes programmatic control logic for: receiving a seed test input or user input via the I/O ports, analyzes the seed test input or user input and extracts key elements for variations, including: extracting syntactical information from the seed test input or user input, including: collecting all seed test input or user input coverage terms including extracting individual key terms; quantifying output of coverage points based on corresponding test outputs and language information relating to extracted individual key terms; and automatically generating a script utilizing the individual key terms extracted. The DVTSA further includes control logic for: utilizing supplementary documents and the quantified output of the coverage points to collect all coverage points. The supplementary documents further include: predefined language information including linguistic databases, mathematical databases, syntactic and semantic databases, such as: GridXML, ROBOT Script, natural language databases, mathematical terminology and databases of variables, statements, and terms defined with respect to hardware. The input coverage terms further include: predefined term and statements for known inputs and outputs of the method. The coverage metrics are variable and actively and automatically updated, and the coverage metrics include an input robustness score and an output robustness score. Each of the input and output robustness scores define a percentage of coverage of a list of or of all possible output instructions of a particular type and name to variable mapping. The input robustness score further accounts for: variations in input terminology; variations in input statement types; and variations in substring interpretation coverage. The output robustness score defines a percentage of coverage of a list of or of all possible output instructions and names to variable mapping. The DVTSA further includes control logic for: identifying and filling information gaps in extracted syntactical information, including: reading, from outputs of the control logic for extracting syntactical information, all terms and phrases relevant to coverage metrics and splitting the terms and phrases into key elements. The DVTSA further includes control logic for: identifying, with first looped control logic, variations for each of the key terms in a given context, and assigning a confidence score to each of the variations for each of the key terms; and identifying, with second looped control logic, input variations for each seed test input statement and user input statement, and assigning a confidence score to each of the seed test and user input statements. The DVTSA further includes control logic for: causing the human validators to manually evaluate outputs of each of the first and second looped control logics for identifying variations for each of the key terms and for each of the seed test input and user input statements; and synthesizing variations that actively adapt to fill identified information gaps. The DVTSA further includes control logic for: performing a coverage measurement of extracted syntactical information, including: applying the coverage metrics to the extracted syntactical information, including: measuring a seed expansion for variation in input terms; measuring a seed expansion for a variation in input statement types; measuring a seed expansion for substring interpretation coverage; measuring a seed expansion for output robustness; and aggregating and normalizing measured seed expansions for the variation in input terms, the variation in input statement types, the substring interpretation, and output robustness, and generating a coverage measurement score. The DVTSA further includes control logic for: causing a human validator to evaluate the coverage measurement relative to predefined coverage metrics and selectively and continuously iterate to cause coverage measurement to increase LLM tool input robustness and output robustness from a first level to a second level greater than the first level, in both production and pre-production LLM tool processes, by causing the human validator to evaluate outputs of the second control logic by selectively and continuously adding to or eliminating examples from the supplementary documents. The DVTSA further includes control logic for: causing the human validator to convert the coverage measurement into an improved seed file and selectively and continuously iterating inputs to the control logic that synthesizes variations that actively adapt to fill identified information gaps to increase LLM tool input and output robustness from the first level to the second level greater than the first level in both production and pre-production LLM tool processes. The method progressively reduces computational resource utilization, progressively increases computational efficiency, and progressively reduces reliance on the human validator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
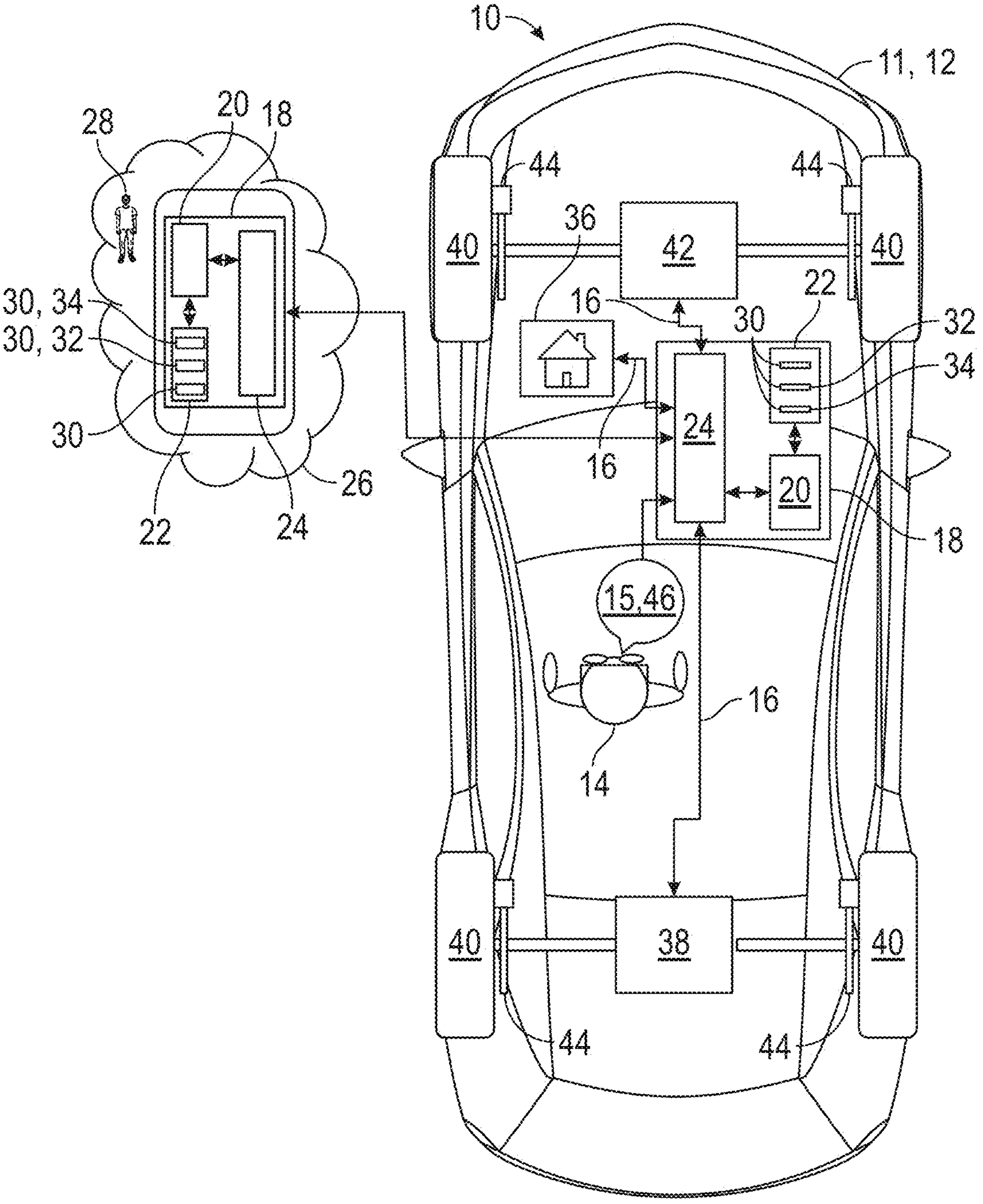
FIG. 1 is a schematic diagram of a system for generating a diversified validation test suite for generative artificial intelligence (AI) powered tools according to an exemplary embodiment.

Referring to FIG. 1, a system 10 for generating a diversified validation test suite for generative artificial intelligence (AI) powered tools is shown in schematic form. The system 10 generally functions in or on a host device 11. The host device 11 may take any of a wide variety of forms, including a vehicle 12. However, it should be appreciated that the system 10 of the present disclosure need not be tied to such a vehicle 12. Rather, the vehicle 12 is merely an exemplary non-limiting embodiment in relation to which the system 10 of the present disclosure is described herein. The system 10 may operate in any hardware and software configuration in which a generative AI powered tool is used to receive inputs from a user 14, such as user commands 15, and generate an output 16 that alters the function of the hardware and/or software configuration or system in which the generative AI powered tool is being used. Additionally, while the vehicle 12 shown is a car, it should be appreciated that the vehicle 12 may be any type of vehicle 12 without departing from the scope or intent of the present disclosure. In several non-limiting examples, the vehicle 12 may be a: car, truck, sport utility vehicle (SUV), semi truck, tractor trailer, tractor, combine harvester or other such farming equipment, powered flight and unpowered aircraft such as a plane, helicopter, glider or autogyro, powered and unpowered watercraft such as: a ship, sailboat, motorboat, pleasure craft, jet ski, sailboat, or the like. In additional non-limiting embodiments, it should be appreciated that the system 10 described herein may be adapted to function with host devices 11 such as manned and unmanned spacecraft such as: satellites, rockets, space stations, and other orbital and extra-orbital satellite-communications-enabled devices without departing from the scope or intent of the present disclosure. In still further non-limiting examples, the host devices 11 may include mobile computing platforms such as laptops, mobile phones, tablets, or any other such host device 11 through which a user may engage with a generative AI powered tool.

The system 10 further includes a controller 18 which is a non-generalized, electronic control device having a preprogrammed digital computer or processor 20, non-transitory computer readable medium or memory 22 used to store data such as control logic, software applications, instructions, computer code, data, lookup tables, etc., and a transceiver or input/output (I/O) ports 24. Computer readable medium or memory 22 includes any type of medium capable of being accessed by a computer, such as read only memory (ROM), random access memory (RAM), a hard disk drive, a compact disc (CD), a digital video disc (DVD), or any other type of memory 22. A "non-transitory" computer readable memory 22 excludes wired, wireless, optical, or other communication links that transport transitory electrical or other signals. A non-transitory computer readable memory 22 includes media where data can be permanently stored and media where data can be stored and later overwritten, such as a rewritable optical disc or an erasable memory device. Computer code includes any type of program code, including source code, object code, and executable code. The processor 20 is configured to execute the code or instructions.

Where the system 10 operates on a vehicle 12, the controller 18 may include a dedicated Wi-Fi controller or an engine control module, a transmission control module, a body control module, an infotainment control module, etc. The transceiver or I/O ports 24 are configured to wirelessly communicate with a back office 26 using cellular protocols including global system for mobile communication (GSM), general packet radio service (GPRS), enhanced data rates for GSM evolution (EDGE), universal mobile telecommunications services (UMTS), high speed packet access (HSPA), code-division multiple access (CDMA), evolution-data optimized (EV-DO/EVDO/1×EV-DO), short message services (SMS), Wi-MAX, manufacturing messages specification (MMS), 2G, 3G, 4G, 5G, wireless and cellular standards as defined under IEEE 802.1X, IEEE 802 LAN/MAN, and IEEE mobile communication networks standards committee (MobiNet-SC) standards, and the like. The back office 26 may include one or more controllers 18 and/or a one or more human validators 28 shown and described in additional detail in subsequent figures.

The controller 18 further includes one or more applications 30. An application 30 is a software program configured to perform a specific function or set of functions. The application 30 may include one or more computer programs, software components, sets of instructions, procedures, functions, objects, classes, instances, related data, or a portion thereof adapted for implementation in a suitable computer readable program code. The applications 30 may be stored within the memory 22 or in additional or separate memory. Examples of the applications 30 include audio or video streaming services, games, browsers, social media, etc., and a diversified validation test suite application (DVTSA) 32 for a generative AI powered tool or large language model (LLM) tool 34. The generative AI powered tool or LLM tool 34 defines an application 30 stored either locally on the vehicle 12 controller 18 and/or in a remote back office 26 or cloud-based computing device. The DVTSA 32 includes a plurality of subroutines or control logic portions.

In examples in which the system 10 operates in or on a vehicle 12, the system 10 and DVTSA 32 may be used by the vehicle development engineering user 14 to validate the tools used to develop and test the system that dynamically adjust the way that the vehicle 12 and vehicle features are operated. In some examples, the vehicle 12 may be equipped with a navigation system 36, one or more drive motors 38 that provide and alter quantities of torque delivered to wheels 40 of the vehicle 12 to cause the vehicle 12 to move, stop, or the like, and a steering system 42 that may adjust a directional heading of the vehicle 12. In additional examples, the vehicle 12 is equipped with a braking system 44 that, when engaged by the controller 18 causes the motion of the vehicle 12 to be retarded. The vehicle 12 may be equipped with a variety of other body motion control systems that may be engaged to alter, or otherwise control dynamic performance of the vehicle 12, including but not limited to aerodynamic control surfaces and actuators, active and/or semi-active suspension systems and actuators, and the like without departing from the scope or intent of the present disclosure.

Referring to FIG. 2 and again to FIG. 1, the DVTSA 32 is shown in additional detail in flowchart form. The DVTSA 32 receives a set of seed test inputs 46 or user inputs 15, uses supplemental documentation 48 and coverage metrics 50 to parse the seed test inputs 46 or user inputs 15 within a first control logic 100 that synthesizes a validation test suite for the LLM enabled tool 34. The seed inputs usually will not be complete with respect to the coverage metrics and therefore the system 10 synthesizes the expanded set of test suite with the coverage metrics in scope. The system 10 then utilizes a checker 54 to analyze the synthesized validation test suite 52 as per the predefined coverage metrics to confirm the completion of the synthesized validation test suite. Then the system 10 can utilize the final validation test suite 56 to validate the outputs of the tool 34. The generated validation test suite can also be used as regression test suite for the tool in case of any tool updates in future. The coverage metrics can include specification on edge case, variations such as typos, repetitions, acronyms, paraphrases in inputs and structural scope of the outputs. The seed test inputs 46 and/or user inputs 15 may be received with any of a variety of hardware and software systems, such as text-based inputs including keyboards, touchscreen interfaces and the like, and/or audiovisual inputs to a human-machine interface (HMI) such as a microphone, a touchscreen or the like. The seed test inputs 46 and/or user inputs 15 are received from the hardware and software systems and/or HMIs via the I/O ports 24. A second control logic 200 then performs a coverage measurement of the outputs of the first control logic 100, using the coverage metrics 50, and then a third control logic 300 causes one or more human validators 28 to evaluate outputs of the second control logic 200. In some examples, the human validators 28 may determine a change is necessary and apply a change request 58 before re-engaging the first control logic 100 once more. In other examples, the human validators 28 may determine that no changes are necessary and approve 60 the outputs of the second control logic 200 and feed the approved outputs to the checker 54 for completeness check and the validation test suite 56 is released for further use.

Figure 2:
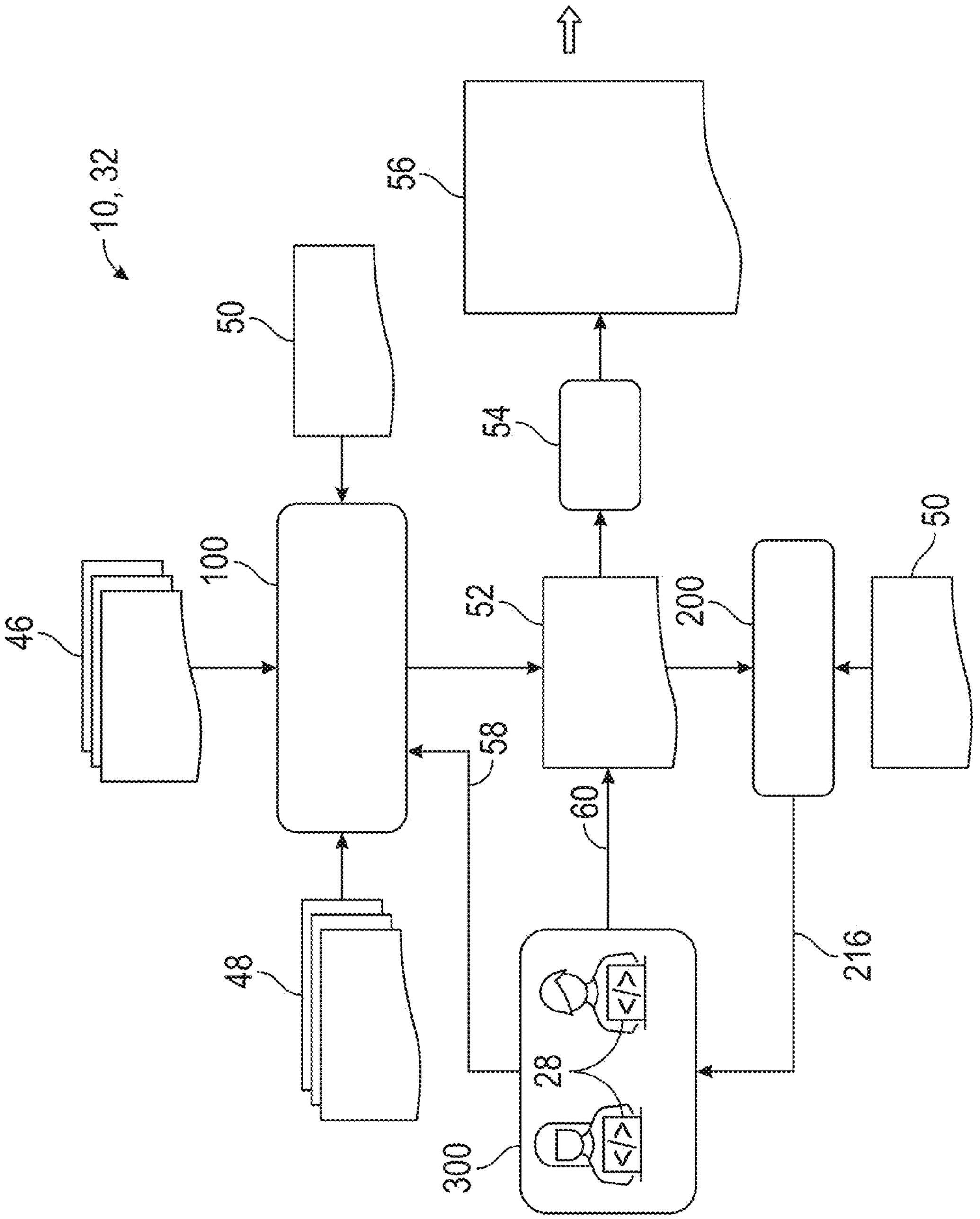
FIG. 2 is a flowchart depicting an overview of control logics of a diversified validation test suite application (DVTSA) for generative AI powered tools of FIG. 1 according to an exemplary embodiment.
Figure 3:
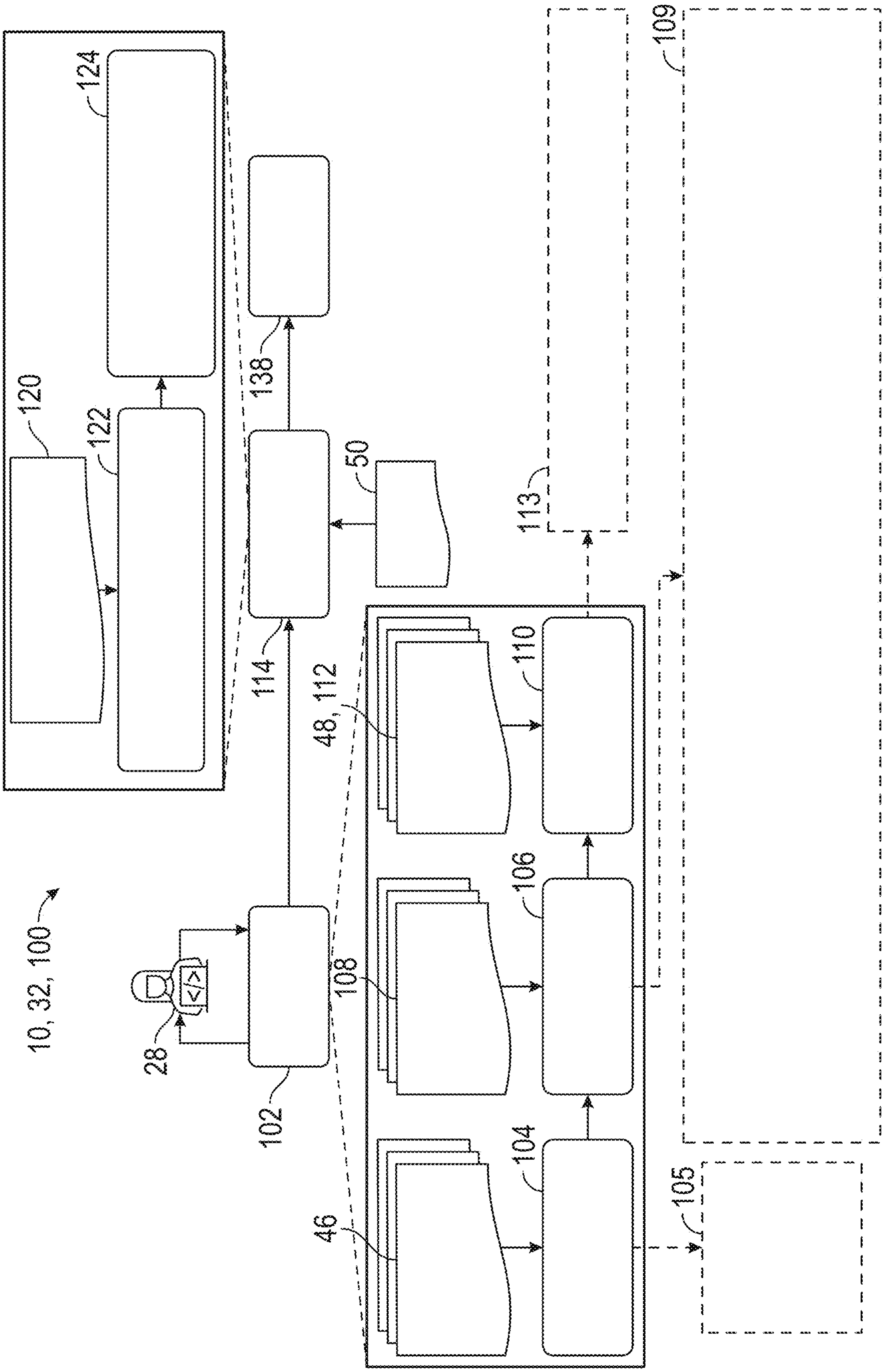
FIG. 3 is a flowchart depicting a first control logic portion of the DVTSA of FIG. 2 according to an exemplary embodiment.

Turning now to FIG. 3 and within continuing reference to FIGS. 1 and 2, the first control logic 100 is shown in further detail. The first control logic 100 includes several subroutines or sub-control logics. The first control logic 100 first executes an extraction control logic 102 that extracts syntactical information from seed test inputs 46 and/or user inputs 15. More specifically, the extraction control logic 102 obtains data from several different sources, including the set of seed test inputs 46 and/or user inputs 15. The seed test inputs 46 and/or user inputs 15 may include a wide variety of information, including but not limited to user commands to the generative AI powered tool or LLM tool 34. Accordingly, the seed test inputs 46 may include linguistic commands that a user intends to engage various vehicle 12 functions, such as: commands to engage a vehicle navigation system, commands to search for a point of interest, commands to change a vehicle cabin temperature, commands to pause or wait or delay, requests to obtain an answer to a mathematical statement, or any other such commands. The extraction control logic 102 collects all input terms with coverage scope at block 104, including extracting syntactic information from the seed test inputs 46. In a non-limiting example, a seed test input 46 or user input 15 such as "Model Delay 1200 Milliseconds" may be extracted as input coverage terms 105 "Model", "Delay", "1200", and "Milliseconds", separately. That is, the first control logic 100, and more specifically, the extraction control logic 102 parses the set of seed test input 46 data into distinct terms.

From block 104, the extraction control logic 102 proceeds to block 106, where the extraction control logic 102 utilizes the corresponding test output for all the seed tests and language information from block 108 to quantify output coverage points 109. The output coverage points 109 from block 106 extract all language constructs that are available as part of the expected outputs for the given seed inputs, for example, all types of "Action" statements:

and more specifically as:

'Action': 'Model.Delay', 'MILLI_SECOND': '1200'. 'ACTION': 'Execute. Test', 'TEST_FILE': '\\Functions\\PreTest.gridXml', 'INPUT_VALUES': 'return_vars'

From block 106, the extraction control logic 102 proceeds to block 110, where the extraction control logic 102 utilizes the supplemental documentation 48 from block 112 to collect and define required coverage points 113. The supplemental documentation 48 at block 112 may include any of a wide variety of information such as software variable name and its description. In several non-limiting examples, the supplemental documentation 48 may be described as or otherwise define a variably changeable, or dynamically updated and changed dictionary or glossary of terms that define specific variable names and meanings within set of seed test inputs 46. From block 110, software variable names, descriptions and types, calibrations, constraints, and the like are extracted and/or applied to the automatically generated script. Once the extraction control logic 102 has completed, the automatically gathered information from the extraction control logic 102 is sent to an identification control logic 114.

Figure 4:
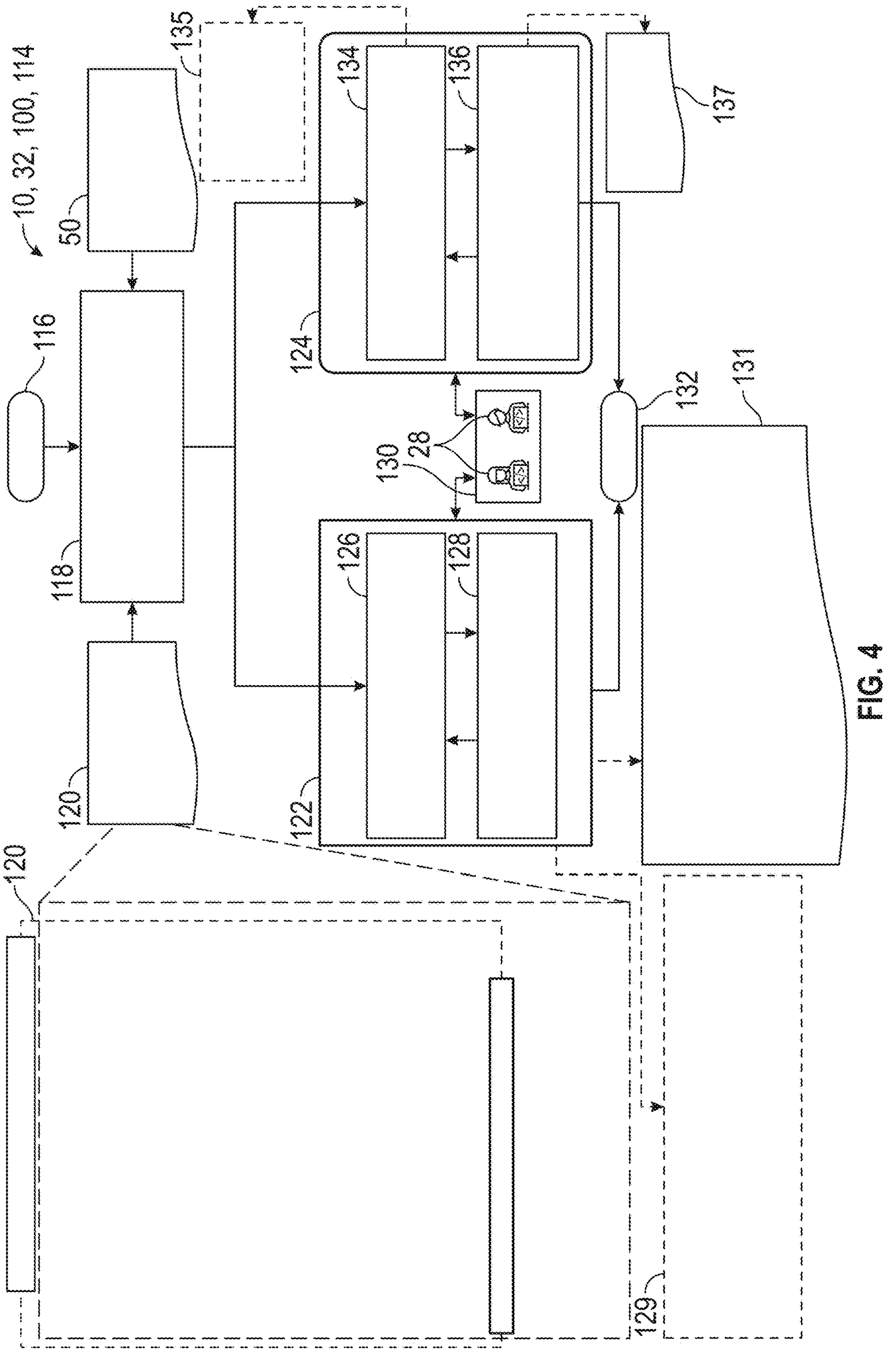
FIG. 4 is a flowchart depicting a second control logic portion of the DVTSA of FIG. 2 according to an exemplary embodiment.

Turning now to FIG. 4, and with continuing reference to FIGS. 1-3, the identification control logic 114 is shown in additional detail. In broad terms, the identification control logic 114 identifies and fills information gaps otherwise synthetically generates additional test inputs based on the seed inputs to satisfy the coverage metrics gap in the original seed test inputs 46. The identification control logic 114 begins at block 116 getting all the extracted information from 102. At block 118, the identification control logic 104 reads all terms and phrases relevant to the coverage metrics 50 and splits the terms and phrases into key elements. In order to determine which terms and phrases are relevant to the coverage metrics 50 and split such terms and phrases into key elements, the identification control logic 114 references input coverage terms 105, output coverage terms 109, and variables stored in a database 120 of predefined, but updatable terms. In several non-limiting examples, the database 120 includes predefined language information linguistic, mathematical, syntactic and semantic databases, such as: GridXML, ROBOT Script, or the like. The database 120 may further include natural language databases, mathematical terminology and/or variable databases, or the like.

The identification control logic 114 then proceeds to first and second processing loops 122 and 124 which may be executed in parallel, simultaneously, sequentially, periodically, or upon occurrence of a triggering condition or event, without departing from the scope or intent of the present disclosure. The first processing loop 122, starting at block 126 calls the LLM engine 34 or any natural language processing tool to identify the key terms extracted at block 102 and read by the block 118. In a non-limiting example, the terms extracted 129 may include a subject object, action, unit terms, and the like such as: {Model, Delay, 1200, Milliseconds}. Subsequently, at block 128, the first processing loop 122 calls the LLM tool 34 to identify variations 131 for each of the extracted terms in the relevant contextual situation, and assigns a confidence score to the variations. Continuing the {Model, Delay, 1200, Milliseconds} example above, plausible description variations may include but are not limited to identified equivalent terms such as:

Model: Simulation, System, Prototype

Delay: Lag, Wait, Pause

1200: Twelve Hundred, one thousand two hundred, 1.2 k

Milliseconds: 0.001 sec, ms, 1/1000 sec, or the like.

From block 128, the first processing loop 122 proceeds to block 130 where human validators 28 perform a manual evaluation, and allow the first processing loop 122 to exit to block 132. The confidence score of the generated terms will help the human validators 28 filter the terms effectively. The human validators 28 have the option to add, edit or remove the set of generated term list. The human validators 28 cause the first processing loop 122 to continue to execute and iterate until acceptable number of valid variations of the terms are generated, at which time the first processing loop 122 exits to block 132. It will be appreciated that the confidence level required for a given set of seed test inputs 46 varies in accordance with the criticality of the systems upon which the seed test inputs 46 are intended to act. In a non-limiting example, when inputs relate to autonomous driving performance or advanced driver assistance systems (ADAS), the confidence score threshold may be substantially higher than in non-critical or non-safety-implicated system functions, such as vehicle 12 entertainment system settings.

The second processing loop 124 begins at block 134 where the identification control logic 114 lists all missing output syntactical statements and variable descriptions. In a non-limiting example, an input 135 may be represented as: {'Action': 'if', 'IF_CONDITION': <VarName>==Val'}. The missing syntactical elements at block 134 are identified within outputs of the extraction control logic 102 with respect to the seed test input 46. Subsequently, at block 136, the identification control logic 104 identifies key input elements for variations, including algebraic expressions, variable names, and the like. For example, for identified key input elements, the system 10 uses the LLM tool 34 to generate more plausible variations such as “Delay” instead of “wait”, and may also simplify complex mathematical expressions. Continuing the {Action . . . } example above, at block 136, the LLM tool 34 is used to verify 137 according to Check <Vars> for Values, or the like. In combination with any identified missing syntactical elements from block 134, and any variations identified at block 136, the identification control logic 114 obtains the coverage metrics 50 from a database or other such storage. The coverage metrics 50 may be fixed or, in some exemplary embodiments, the coverage metrics 50 are variable and actively and automatically updated. The coverage metrics 50 may also vary between applications or systems involved in responding to the seed test input 46 data. In additional aspects, the coverage metrics 50 include an input robustness score and an output robustness score. The input robustness score accounts for variations in terms, variations in input statement types, and substring interpretation coverage. In some examples, the variations in terms may include typographical errors, abbreviations, synonym terms, and the like. In some specific non-limiting examples, synonym terms may be wait/delay or read/get, or the like. Variations in input statement types include variations in algebraic expressions that may range from simple expressions to complex expressions, multiple line outputs, and the like. In a specific non-limiting example, the variations in input statement types is “state A to B with input X”, which may also be expressed as, “With input X, transition to state B from state A”, or the like. Substring interpretation coverage may include instructions to perform specific tasks, such as, “Replace set to ‘=’”. However, substring interpretation coverage is also specifically designed not to replace terms that include the substring within a larger string. In the example in which “set” is being replaced by “=”, the terms “reset”, “dataset”, “preset”, and “subset” would not be replaced or modified. In several aspects, the output robustness score is a percentage of coverage of the list of or of all possible output instructions of a particular type and name to variable mapping.

In safety-critical systems, such as vehicular propulsion systems, braking systems, steering systems, advanced driver assistance systems (ADAS), and the like, the coverage metrics 50 may require that the output robustness score of the system 10 be at least ninety-five percent (95%), while non-safety-critical systems may require only at least ninety percent (90%) accuracy. It will be appreciated that the 95% and 90% robustness scores listed above are intended only to be non-limiting examples of possible coverage metrics 50.

From block 136, the second processing loop 124 proceeds to block 130 where the human validators 28 perform a manual evaluation of outputs from the second processing loop 124 and either allow the second processing loop 124 to exit to block 132 when the confidence score for the identified input variations at block 136 is sufficiently high, or when a threshold confidence score has not been achieved, the human validators 28 cause the second processing loop 124 to continue to execute and iterate until such time as the identified input variations at block 136 have achieved the threshold confidence level, at which time the second processing loop 124 exits to block 132. As above, it will be appreciated that the confidence level required for a given set of seed test inputs 46 varies in accordance with the criticality of the systems upon which the seed test inputs 46 are intended to act. In a non-limiting example, when inputs relate to autonomous driving performance or advanced driver assistance systems (ADAS), the confidence score threshold may be substantially higher than in non-critical or non-safety-implicated system functions, such as vehicle 12 entertainment system settings.

Figure 5:
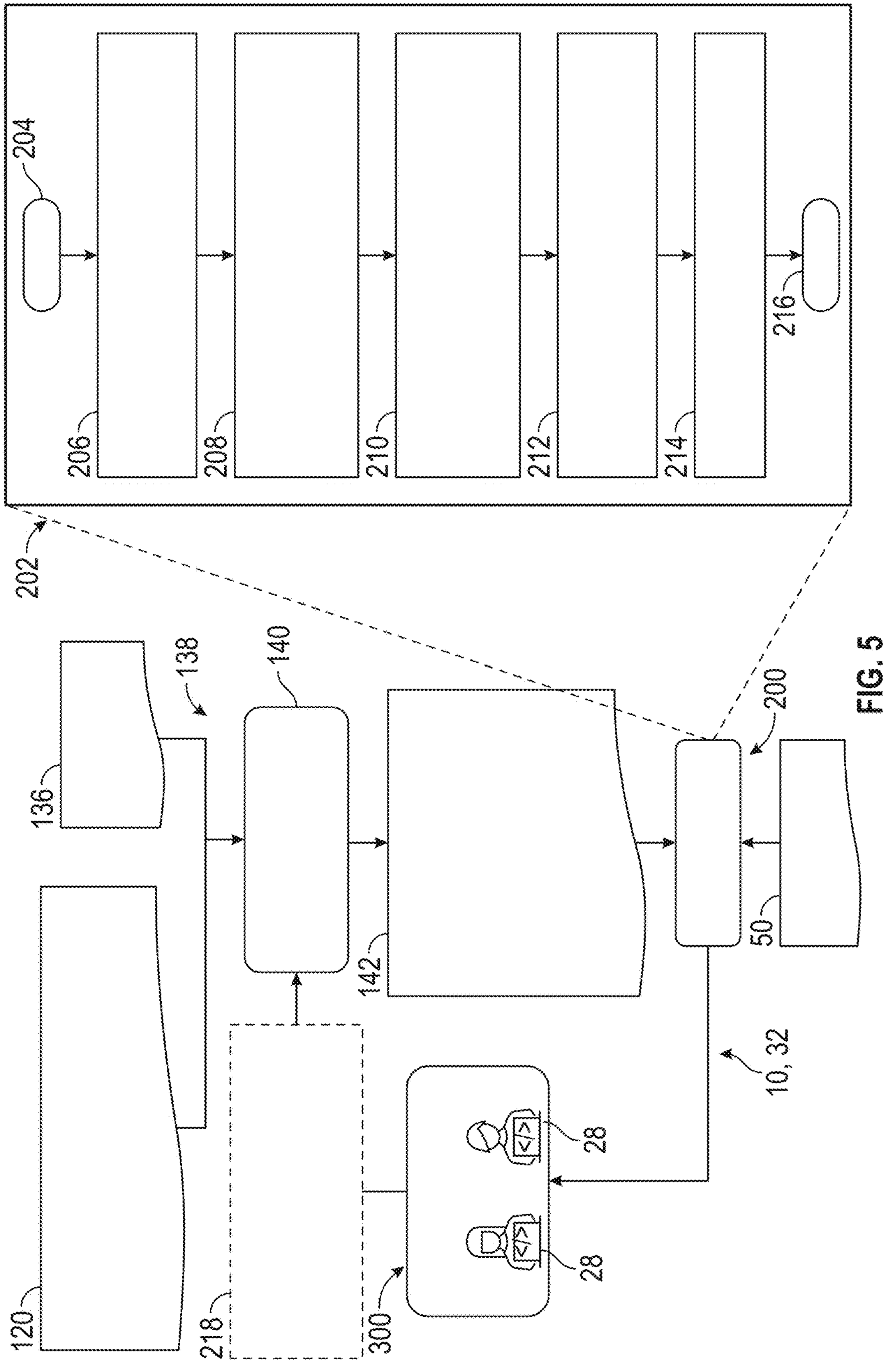
FIG. 5 is a flowchart depicting a third control logic portion of the DVTSA of FIG. 2 according to an exemplary embodiment.

Referring now to FIGS. 3 and 5, and with continuing reference to FIGS. 1, 2, and 4, upon completion of the identification control logic 114, the first control logic proceeds to a variation synthesization control logic 138 which is shown in detail in FIG. 5.

The variation synthesization control logic 138 receives term variations and contextual information from block 128 of the first control loop 122 and input variations or variables from block 136 of the second control loop 124. At block 140, variations or paraphrases are synthesized through use of the LLM tool 34 along with permutations, and combinations generated thereby as shown in output block 142 where: {Model, Delay, 1200, Milliseconds} is defined as being equivalent to:

Simulation Wait 1200 Ms
System Pause Twelve hundred ms
Check <Vars> for Values
Check <Var1* Var2+Constant> for Values
Check <var1> and <var2> are Equal.

Subsequently, the DVTSA 32 executes the second control logic 200 to perform a coverage measurement 202 of the outputs of the first control logic 100, using the coverage metrics 50. The second control logic 200 begins at block 204. At block 206 the coverage measurement accounts for a variation in input terms by measuring seed term 46 expansion. In an example, seed term 46 expansion may extend from a first seed 46 to a one hundredth seed term 46, however alternate embodiments and quantities of seed terms 46 are intended to be within the scope of the present disclosure. From block 206, the second control logic 200 proceeds to block 208 where variations in input statement types are accounted for with a plurality of seed statements. The seed statements may extend from a first seed statement to a fiftieth seed statement, however, additional or fewer seed statements are intended to be within the scope of the present disclosure. Subsequently at block 210, the second control logic 200 performs substring interpretation coverage to verify that substrings are being accurately represented and not errantly replaced with substring seed expansion that may include up to five substring seeds. However, additional or fewer substring seeds are contemplated. At block 212, the second control logic 200 calculates an output robustness to verify a quality and reliability of the outputs of the first control logic 100 and the second control logic 200 vis-à-vis the input seed terms 46. In several examples, the output robustness is measured via an output robustness seed expansion that includes up to five output robustness seeds. However, additional or fewer output robustness seeds are contemplated. At block 214, the second control logic 200 aggregates and normalizes the values of the seed expansions carried out in blocks 206, 208, 210 and 212 and obtains the coverage measurement score as an output at block 216 where the second control logic 200 ends. The coverage of each category can be constrained to generate a limited number of variations and can be weighted for coverage measurement and can also be a qualitative measure based on the user or applications. The coverage measurement score 216 and coverage metrics 50 are then compared both within the second control logic 200 and within the third control logic 300, where the coverage measurement score 216 and coverage metrics 50 are manually evaluated by one or more human validators 28. The human validators 28 may perform a variety of functions, but in some specific non-limiting examples, the human validators 28 eliminate examples or duplicates, add information or examples, and covert or otherwise implement improved seed files which are then used within the first and second control logics 100, 200, and specifically within the extraction control logic 102, and the identification control logic 114.

By using the system 10, and methodology including using the DVTSA 32 of the present disclosure, a variety of advantages are realized in systems that utilize LLM tools 34 to perform or engage in a variety of activities and tasks. The DVTSA 32 provides for a continually updating, robust way of validating LLM based tool 34 responses to user inputs 15 in both production and pre-production processes. That is, in a pre-production or prototype application, the DVTSA 32 may be used by engineering users to ensure that analysis of seed test inputs 46 is thorough and that key elements are identified and extracted despite variations in syntax, language, expression, grammar, or the like. The DVTSA 32 provides a robust set of processes that quantify output elements and ensure correct and accurate correspondence with plausible inputs, as well as synthesizing coherent inputs based on individual variations. Further, the DVTSA 32 carries out the above-noted processes automatically, but includes a human evaluation loop in which inputs and outputs of the DVTSA 32 are refined to remove potential sources of error or duplication. Accordingly, in a pre-production environment or application, the system 10 and DVTSA 32 of the present disclosure refine the LLM tool 34 to ensure that engineers engaging with the system 10, or vehicle 12 via the LLM tool 34 are properly understood by the LLM tool 34 despite variations in communications styles and substance. Engineers may interact with systems 10 of a host device 11 or vehicle 12 via the DVTSA 32 and LLM tool 34 to actually train or program potential production databases of responses such as supplemental documentation 48, coverage metrics 50 and the like utilized in future production-based usage by customers.

In addition, the DVTSA 32 offers automation advantages that reduce quantities of human effort and man-hours necessary to generate validation and evaluation testing suites for LLM based tools 34, specifically by: automatically generating scripts based on seed test inputs 46, utilizing the identification control logic 104 to identify and fill information gaps in the input statements from system 10 users, utilizing the variation synthesization control logic 138 to generate expected inputs to fill the information gaps identified within the identification control logic 104, and applying coverage metrics 50 and the in-loop human validator 28 to ensure the LLM based tool 34 is accurately understanding the user input 15 statements and generating an appropriate, accurate, reliable, and robust output in response to the user input 15 statements. Moreover, through the DVTSA's 32 automatic script generation, a potential for human-introduced typographical, syntactical, or other such errors is reduced from a first quantity to a second quantity substantially less than the first quantity. The automatically generated test case or script further allows more thorough validation, higher accuracy, faster processing and lower human time investment to validate the LLM powered tool's 34 responses. It will further be appreciated that in either pre-production or production guises, as the DVTSA 32 is continuously evaluated and updated over time, a quantity of human validator 28 interaction and input is decreased. That is, even in a production application in which a non-engineer end user or customer interacts with the LLM based tool 34, the DVTSA 32 operates to accurately, consistently, reliably, and robustly interpret end user or customer inputs to the system 10 and generate an appropriate response accordingly, with progressively reduced computational resource utilization, progressively increased computational efficiency, and progressively reduced reliance on human validator 28 verification processes.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a diversified validation test suite for generative artificial intelligence (AI) powered tools, the system comprising:

a controller having a processor, a memory, and input/output (I/O) ports, the processor executing programmatic control logic stored in the memory, the programmatic control logic comprising a diversified validation test suite application (DVTSA) for a generative AI powered tool or large language model (LLM) tool, the DVTSA comprising:

a first control logic that receives a seed test input or user input via the I/O ports and coverage metrics, analyzes the seed test input or the user input and extracts key elements for variations;

a second control logic that performs, using the coverage metrics, a coverage measurement of outputs of the first control logic; and a third control logic that causes a human validator to evaluate outputs of the second control logic relative to predefined coverage metrics and selectively and continuously iterate to cause the outputs of the second control logic to increase input robustness and output robustness of the LLM tool from a first level to a second level in both production and pre-production LLM tool processes, wherein the second level is greater than the first level and wherein the system progressively reduces computational resource utilization, progressively increases computational efficiency, and progressively reduces reliance on the human validator.

2. The system of claim 1, wherein the first control logic further comprises:

a control logic for extracting syntactical information from the seed test input or the user input;

a control logic that identifies and fills information gaps in the extracted syntactical information; and a control logic that synthesizes variations that actively adapt to fill the identified information gaps.

3. The system of claim 2, wherein the control logic for extracting the syntactical information further comprises:

control logic that collects all seed test input coverage terms or user input coverage terms including extracting individual key terms;

control logic that quantifies output of coverage points based on corresponding test outputs and language information relating to the extracted individual key terms;

control logic that automatically generates a script utilizing the extracted individual key terms; and control logic that utilizes supplementary documents and the quantified output of the coverage points to collect all coverage points.

4. The system of claim 3, wherein the supplementary documents further comprise:

predefined language information including linguistic databases, mathematical databases, syntactic and semantic databases, wherein all of the databases include GridXML, ROBOT Script, natural language databases, mathematical terminology and databases of variables, statements, and terms defined with respect to system hardware.

5. The system of claim 3, wherein the seed test input coverage terms and the user input coverage terms comprise:

predefined term and statements for known inputs and known outputs of the system; and wherein the coverage metrics are variable and actively and automatically updated, and wherein the coverage metrics include an input robustness score and an output robustness score, wherein each of the input robustness score and the output robustness score defines a percentage of coverage of a list of or of all output instructions of a particular type and name to variable mapping.

6. The system of claim 5 wherein the input robustness score further accounts for:

variations in input terminology;

variations in input statement types; and variations in substring interpretation coverage; and wherein the output robustness score comprises:

a percentage of coverage of a list of or of all output instructions and names to variable mapping.

7. The system of claim 3, wherein the control logic that identifies and fills the information gaps further comprises:

control logic that reads, from outputs of the control logic for extracting the syntactical information, all terms and phrases relevant to the coverage metrics and splits the terms and the phrases into key elements;

first looped control logic that identifies variations for each of key terms in a given context, and assigns a confidence score to each of the variations for each of the key terms in the given context; and second looped control logic that identifies input variations for each of seed test input statement and user input statement, and assigns a confidence score to each of the seed test input statement and the user input statement.

8. The system of claim 7, wherein the DVTSA further comprising:

control logic that causes the human validator to manually evaluate the outputs of each of the first and the second looped control logics for identifying variations for each of the key terms in the given context and for each of the seed test input statement and the user input statement.

9. The system of claim 5, wherein the second control logic further comprises:

control logic, that applies the coverage metrics to the outputs of the first control logic, including:

measuring a seed expansion for variation in input terms;

measuring a seed expansion for a variation in input statement types;

measuring a seed expansion for substring interpretation coverage;

measuring a seed expansion for the output robustness; and aggregating and normalizing the measured seed expansions for the variation in the input terms, the variation in the input statement types, the substring interpretation, and the output robustness, and generating a coverage measurement score.

10. The system of claim 4, wherein the third control logic further comprises:

control logic that causes the human validator to evaluate the outputs of the second control logic by selectively and continuously adding to or eliminating examples from the supplementary documents; and control logic that causes the human validator to convert the coverage measurement into an improved seed file and selectively and continuously iterating inputs to the control logic that synthesizes the variations that actively adapt to fill the identified information gaps to increase the input robustness and the output robustness from the first level to the second level in both the production and the pre-production LLM tool processes.

11. A method for generating a diversified validation test suite for generative artificial intelligence (AI) powered tools, the method comprising:

executing programmatic control logic stored in memory of a controller having a processor, the memory, and input/output (I/O) ports, the programmatic control logic comprising a diversified validation test suite application (DVTSA) for a generative AI powered tool or large language model (LLM) tool;

receiving a seed test input or user input via the I/O ports and coverage metrics;

analyzing the seed test input or the user input;

extracting key elements within the seed test input or the user input for variations;

performing, using the coverage metrics, a coverage measurement of outputs of the analyzing and the extracting steps; and evaluating outputs of the performing step relative to predefined coverage metrics and selectively and continuously iterating to increase input robustness and output robustness of the LLM tool from a first level to a second level in both production and pre-production LLM tool processes, wherein the second level is greater than the first level, and wherein the method progressively reduces computational resource utilization, progressively increases computational efficiency, and progressively reduces reliance on a human validator.

12. The method of claim 11 further comprising:

extracting syntactical information from the seed test input or the user input;

identifying and filling information gaps in the extracted syntactical information; and synthesizing variations that actively adapt to fill the identified information gaps.

13. The method of claim 12, further comprising:

collecting all seed test input coverage terms or user input coverage terms including extracting individual key terms;

quantifying output of coverage points based on corresponding test outputs and language information relating to the extracted individual key terms;

automatically generating a script utilizing the extracted individual key terms; and utilizing supplementary documents and the quantified output of the coverage points to collect all coverage points.

14. The method of claim 13, wherein utilizing the supplementary documents further comprises:

accessing and referencing predefined language information including linguistic databases, mathematical databases, syntactic and semantic databases, wherein all of the databases include GridXML, ROBOT Script, natural language databases, mathematical terminology and databases of variables, statements, and terms defined with respect to system hardware.

15. The method of claim 13, wherein collecting all the seed test input coverage terms or the user input coverage terms further comprises:

collecting predefined term and statements for known inputs and known outputs of the method; and wherein the coverage metrics are variable and actively and automatically updated, and wherein the coverage metrics include an input robustness score and an output robustness score, wherein each of the input robustness score and the output robustness score defines a percentage of coverage of a list of or of all output instructions of a particular type and name to variable mapping.

16. The method of claim 15, wherein evaluating the outputs of the performing step relative to the predefined coverage metrics further comprises:

evaluating outputs of the performing step relative to the input robustness score, wherein the input robustness score accounts for:

variations in input terminology;

variations in input statement types; and variations in substring interpretation coverage; and wherein the output robustness score comprises:

a percentage of coverage of a list of or of all output instructions and names to variable mapping.

17. The method of claim 13, further comprising:

reading, from outputs of the extracting the syntactical information, all terms and phrases relevant to the coverage metrics and splitting the terms and the phrases into key elements;

identifying, with first looped control logic, variations for each of key terms in a given context, and assigning a confidence score to each of the variations for each of the key terms in the given context; and identifying, with second looped control logic, input variations for each of seed test input statement and user input statement, and assigning a confidence score to each of the seed test input statement and the user input statement; and causing human validators to manually evaluate outputs of each of the looped control logics for identifying variations for each of the key terms in the given context and for each of the seed test input statement and the user input statement.

18. The method of claim 15, further comprising:

applying the coverage metrics to the outputs of the analyzing and the extracting steps, the applying including:

measuring a seed expansion for variation in input terms;

measuring a seed expansion for a variation in input statement types;

measuring a seed expansion for substring interpretation coverage;

measuring a seed expansion for the output robustness; and aggregating and normalizing the measured seed expansions for the variation in the input terms, the variation in the input statement types, the substring interpretation, and the output robustness, and generating a coverage measurement score.

19. The method of claim 14, further comprising:

causing the human validator to evaluate the outputs of the performing step by selectively and continuously adding to or eliminating examples from the supplementary documents; and causing the human validator to convert the coverage measurement into an improved seed file and selectively and continuously iterating inputs to the control logic that synthesizes the variations that actively adapt to fill the identified information gaps to increase the input robustness and the output robustness from the first level to the second level in both the production and the pre-production LLM tool processes.

20. A method for generating a diversified validation test suite for generative artificial intelligence (AI) powered tools, the method comprising:

executing programmatic control logic stored in memory of a controller having a processor, the memory, and input/output (I/O) ports, the processor executing the programmatic control logic, the programmatic control logic comprising a diversified validation test suite application (DVTSA) for a generative AI powered tool or large language model (LLM) tool, the DVTSA including control logic for:

receiving a seed test input or user input via the I/O ports and coverage metrics, analyzing the seed test input or the user input and extracts-extracting key elements for variations, the receiving and analyzing including:

extracting syntactical information from the seed test input or the user input, the extracting including:

collecting all seed test input coverage terms or user input coverage terms including extracting individual key terms;

quantifying output of coverage points based on corresponding test outputs and language information relating to the extracted individual key terms;

automatically generating a script utilizing the extracted individual key terms; and utilizing supplementary documents and the quantified output of the coverage points to collect all coverage points, wherein the supplementary documents further comprise:

predefined language information including linguistic databases, mathematical databases, syntactic and semantic databases, wherein all of the databases include GridXML, ROBOT Script, natural language databases, mathematical terminology and databases of variables, statements, and terms defined with respect to hardware;

wherein the seed test input coverage terms and the user input coverage terms further comprise:

predefined term and statements for known inputs and known outputs of the method; and wherein the coverage metrics are variable and actively and automatically updated, and wherein the coverage metrics include an input robustness score and an output robustness score, wherein each of the input robustness score and output robustness score defines a percentage of coverage of a list of or of all output instructions of a particular type and name to variable mapping;

wherein the input robustness score further accounts for:

variations in input terminology;

variations in input statement types; and variations in substring interpretation coverage; and wherein the output robustness score comprises:

a percentage of coverage of a list of or of all output instructions and names to variable mapping;

identifying and filling information gaps in the extracted syntactical information, the identifying including:

reading, from outputs of the control logic for extracting the syntactical information, all terms and phrases relevant to the coverage metrics and splitting the terms and the phrases into key elements;

identifying, with first looped control logic, variations for each of key terms in a given context, and assigning a confidence score to each of the variations for each of the key terms in the given context; and identifying, with second looped control logic, input variations for each seed test input statement and user input statement, and assigning a confidence score to each of the seed test and user input statements;

causing human validators to manually evaluate outputs of each of the first and second looped control logics for identifying variations for each of the key terms in the given context and for each of the seed test input and user input statements; and synthesizing variations that actively adapt to fill the identified information gaps;

performing, using the coverage metrics, a coverage measurement of the extracted syntactical information, the performing including:

applying the coverage metrics to the extracted syntactical information, including:

measuring a seed expansion for variation in input terms;

measuring a seed expansion for a variation in input statement types;

measuring a seed expansion for substring interpretation coverage;

measuring a seed expansion for output robustness; and aggregating and normalizing the measured seed expansions for the variation in the input terms, the variation in the input statement types, the substring interpretation, and the output robustness, and generating a coverage measurement score; and causing one or more of human validators to evaluate the coverage measurement relative to predefined coverage metrics and selectively and continuously iterate to cause the coverage measurement to increase input robustness and output robustness LLM tool from a first level to a second level in both production and pre-production LLM tool processes, by causing the one or more of human validators to evaluate outputs of the performing step by selectively and continuously adding to or eliminating examples from the supplementary documents, wherein the second level is greater than the first level; and by causing the one or more of human validators to convert the coverage measurement into an improved seed file and selectively and continuously iterating inputs to the control logic that synthesizes the variations that actively adapt to fill the identified information gaps to increase the input robustness and the output robustness from the first level to the second level in both the production and the pre-production LLM tool processes, wherein the method progressively reduces computational resource utilization, progressively increases computational efficiency, and progressively reduces reliance on the one or more of human validators.

* * * * *